Figure 1:
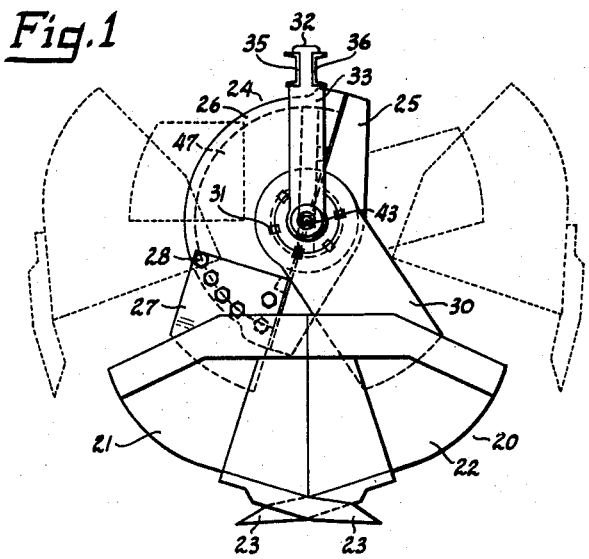

Jan. 27, 1959　　　J. M. RIDDELL　　　2,870,556
FLUID POWER MOTOR APPARATUS
Filed Dec. 6, 1954　　　　　　　　　　　5 Sheets-Sheet 1

Inventor
J. Murray Riddell
By H R Rather
Attorney

Jan. 27, 1959 J. M. RIDDELL 2,870,556
FLUID POWER MOTOR APPARATUS
Filed Dec. 6, 1954 5 Sheets-Sheet 2
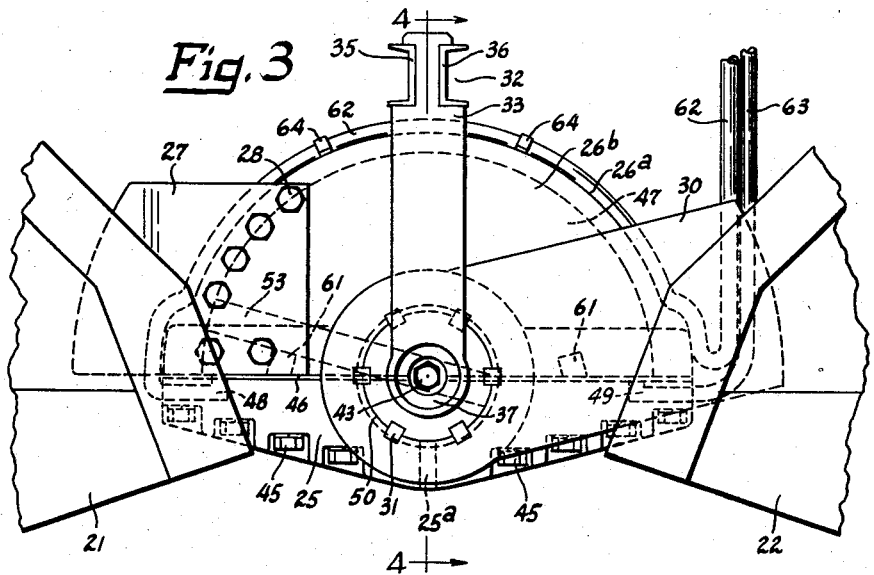
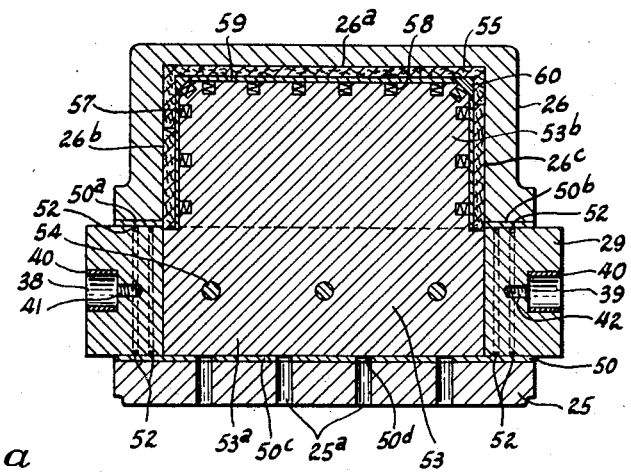
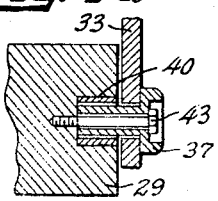
Inventor
J. Murray Riddell
By H R Rather
Attorney Jan. 27, 1959
J. M. RIDDELL
2,870,556
FLUID POWER MOTOR APPARATUS
Filed Dec. 6, 1954
5 Sheets-Sheet 3
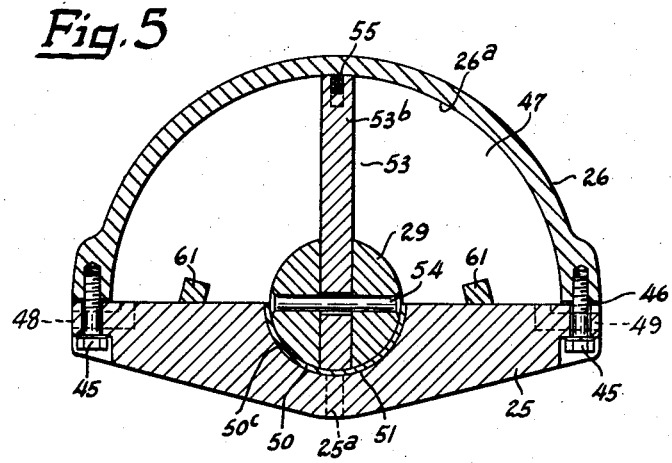
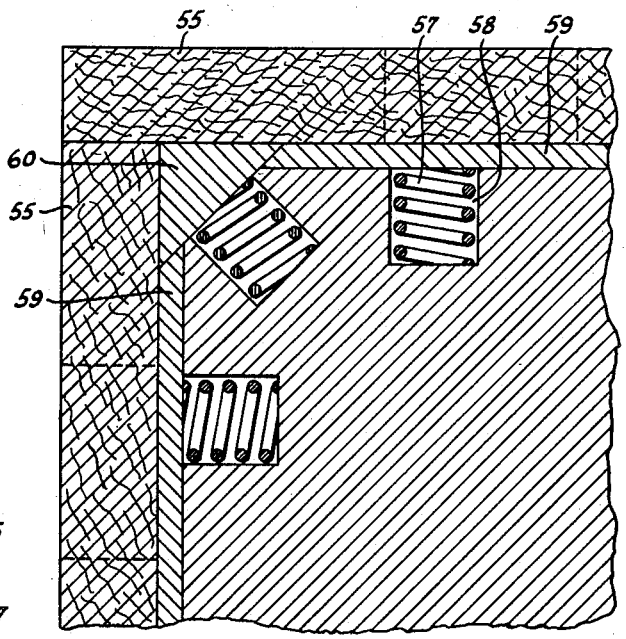
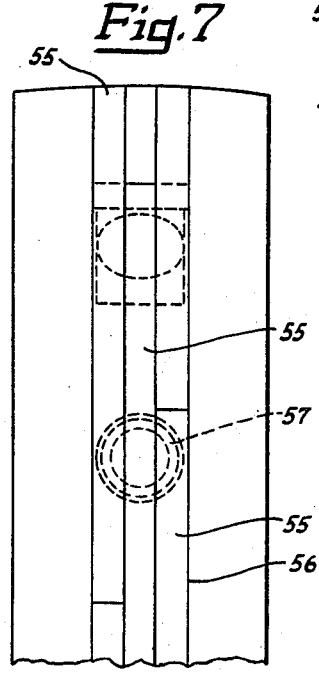
Inventor
J. Murray Riddell
By H R Rather
Attorney Jan. 27, 1959  J. M. RIDDELL  2,870,556
FLUID POWER MOTOR APPARATUS
Filed Dec. 6, 1954  5 Sheets-Sheet 4
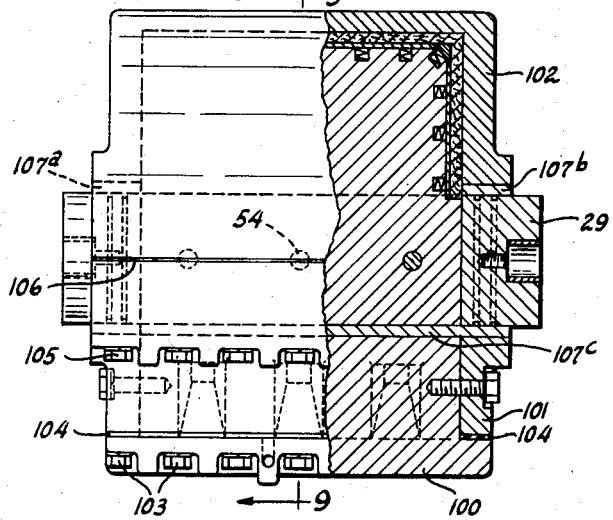
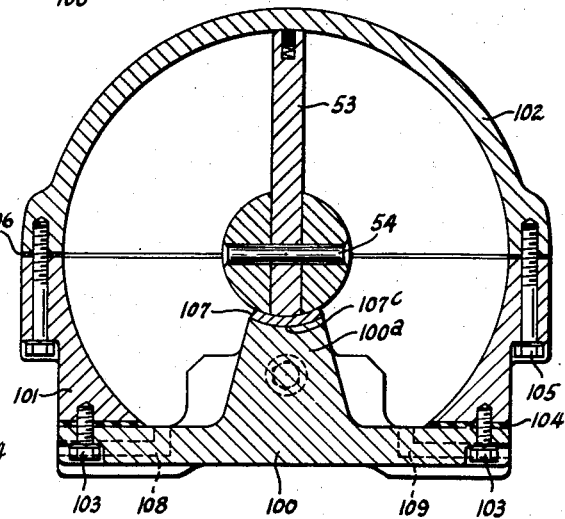
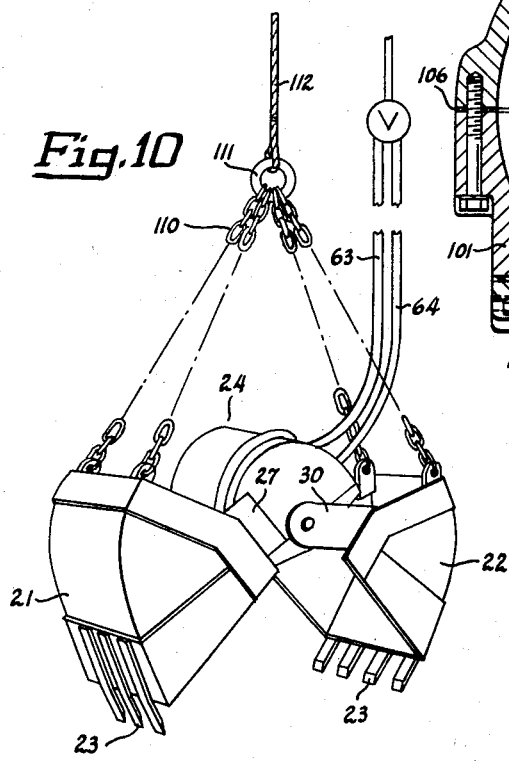
Inventor
J. Murray Riddell
By H R Rather
Attorney Jan. 27, 1959  J. M. RIDDELL  2,870,556
FLUID POWER MOTOR APPARATUS
Filed Dec. 6, 1954  5 Sheets-Sheet 5
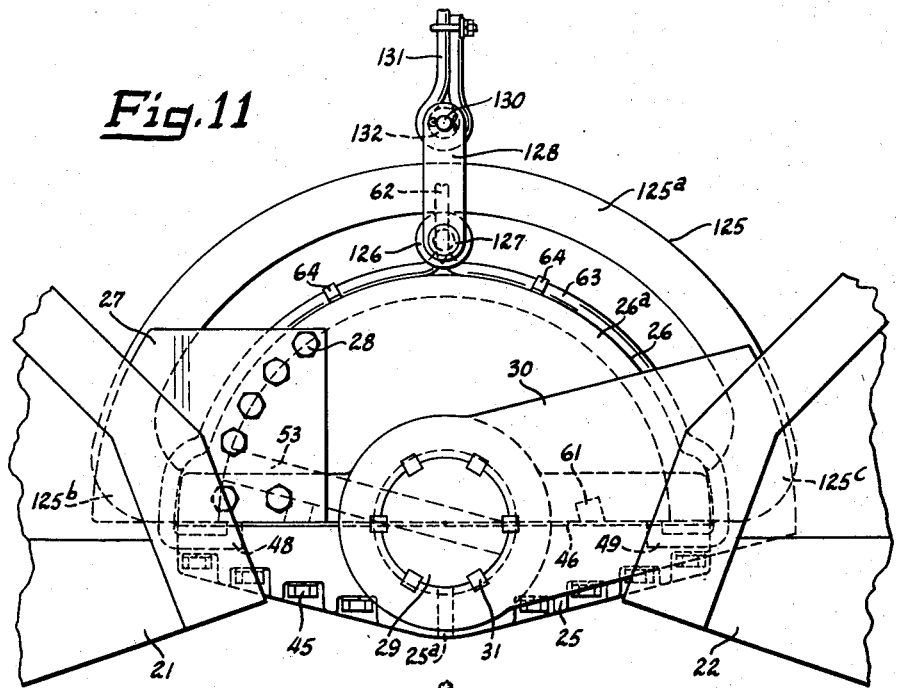
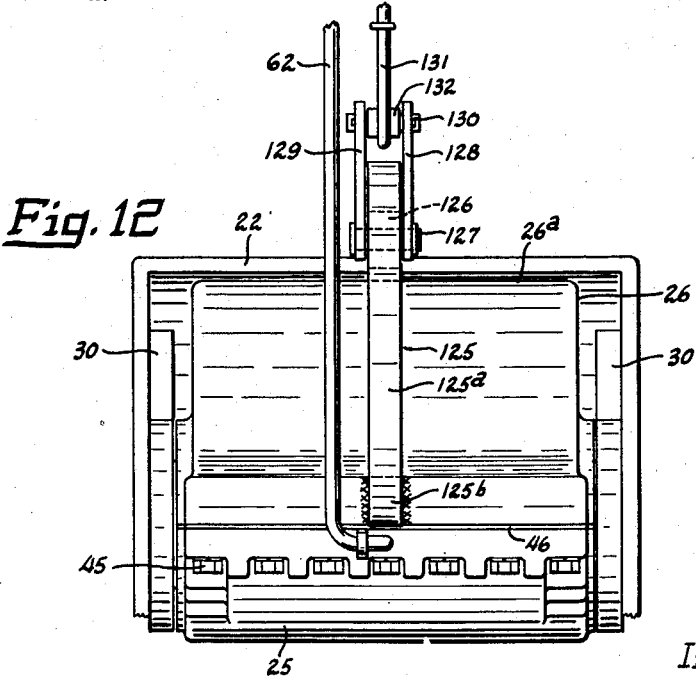
Inventor
J. Murray Riddell
By H R Rather
Attorney United States Patent Office 2,870,556
Patented Jan. 27, 1959

2,870,556
FLUID POWER MOTOR APPARATUS
Joseph Murray Riddell, Houghton, Mich.
Application December 6, 1954, Serial No. 473,423
10 Claims. (Cl. 37—184)

This invention relates to fluid power motor apparatus.
While not limited thereto the present invention is particularly suited for opening and closing clam shell shovels and the like.

The use of conventional clam shell shovels, with cable and pulley opening and closing apparatus, presents problems in the use of such shovels in confined spaces, such as in the sinking of vertical access shafts for mines and tunnels. Because their center of gravity is rather high they are prone to tipping over under slack hoist line conditions, and this is an ever present hazard to workmen on the shaft bottoms. Also, the cable and pulley opening and closing apparatus when operated to close the buckets tends to lift the latter away from the muck or rubble, which to a certain extent reduces the effectiveness of the mass of the buckets bearing down in the rubble and aiding in the scooping action of the closing buckets.

Fluid motors of the vertically and horizontally mounted rectilinearly moving piston type have heretofore been fitted to clam shell shovels. Clam shell shovels having such motors vertically mounted have rather high centers of gravity, and the use of horizontally mounted motors of the aforementioned type require fluid pressures that are so high as to result in rapid fluid line deterioration and in very hazardous conditions for workmen in the event of line failures. Certain of the vertically mounted motors also require the use of extremely high fluid pressures which involves the difficulties just mentioned.

It is a primary object of the present invention to provide improved forms of single vane fluid motors of the type wherein the rotor shaft is reversely rotatable within limits of a single revolution or less.

A more specific object is to provide improvement in pressure seal construction and to facilitate ease in assembly and maintenance of motors of the aforementioned type.

Another more specific object is to provide an improved form of piston vane construction for motors of the aforementioned type.

A further specific object is to provide an improved bearing construction for motors of the aforementioned type and Another important object of the invention is to provide improved clam shell shovel apparatus incorporating motors of the aforementioned type to open and close the buckets thereof, whereby the center of gravity of the complete apparatus is appreciably lowered and the operating fluid need only be maintained at nominal, non-hazardous working pressures.

Other objects and advantages of the invention will hereinafter appear.

The accompanying drawings illustrate preferred embodiments of the invention which will now be described in detail, it being understood that the embodiments illustrated are susceptible of modification without departing from the scope of the appended claims.

Figure 2:
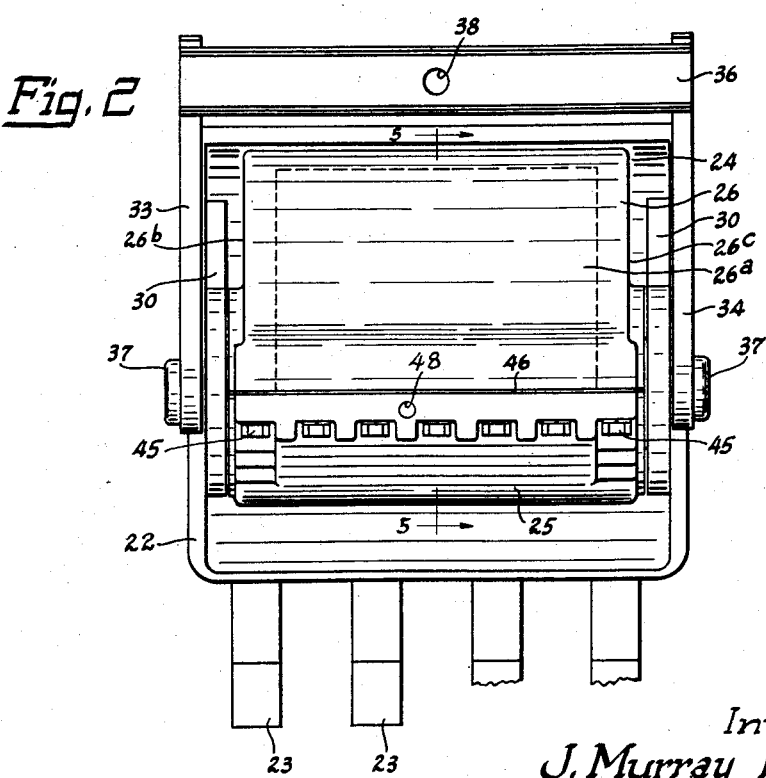

In the drawings:
Figure 1 is a view in end elevation of a clam shell shovel and a fluid power motor operator therefor,
Fig. 2 is a side view, to larger scale, of the apparatus of Fig. 1,
Fig. 3 is a fragmentary view in end elevation of a portion of the apparatus shown in Fig. 1,
Fig. 4 is a view in longitudinal cross section taken along the line 4—4 of Fig. 3,
Fig. 4a is a fragmentary sectional view of certain structural details of the apparatus of Figs. 1 to 3,
Fig. 5 is a view taken along the line 5—5 of Fig. 2,
Fig. 6 is a fragmentary sectional view of the piston vane and pressure seal means shown in Fig. 4,
Fig. 7 is a fragmentary end view of certain elements shown in Fig. 6.
Fig. 8 is a side view, partially in longitudinal section, of a modified form of fluid power motor.
Fig. 9 is a view in transverse cross section taken along the line 9—9 of Fig. 8.
Fig. 10 is a perspective view showing a clam shell shovel apparatus of the type shown in Figs. 1 to 5, but having a modified form of hoist suspension.
Fig. 11 is a fragmentary view illustrating still another form of hoist suspension for such clam shell apparatus, and
Fig. 12 is an end view of the modified form of Fig. 11.

Referring to Figs. 1 to 3, the numeral 20 generally designates a clam-shell shovel comprising the buckets 21 and 22, each of which has a plurality of digging teeth 23 rigidly secured to its lower surface adjacent its mating edge. A fluid power motor, generally designated 24, and having a base 25 and a semi-cylindrical housing member 26, is provided to open and close buckets 21 and 22. The bucket 21 is secured to the housing 26 by arms 27 which are welded to the inner surfaces of the sides of the bucket and bolted to the sides of housing 26 by cap screws 28. Bucket 22 is secured to the rotor shaft 29 of motor 24 by arms 30, which are secured to the inner surfaces of the sides of the latter bucket, as by welding, and which are keyed to rotor shaft 29 by a plurality of spline keys 31.

The shovel buckets and fluid motor operator 24 are supported by a hoist frame or yoke generally designated 32. Yoke 32 comprises spaced apart parallel members 33 and 34, and channel members 35 and 36 welded to upper end portions of members 33 and 34; the latter being notched (as best shown in Fig. 3) to accommodate members 35 and 36. Adjacent their lower ends, members 33 and 34 are provided with alined openings which accommodate cap pins 37 that project into axial end recesses 38 and 39 in rotor shaft 29 which are fitted with bearing bushings 40. Threaded recesses 41 and 42 of reduced diameter open to the inner ends of recesses 38 and 39, and cap screws 43 which penetrate axial openings extending through the pins 37 take down in such recesses to secure the pins 37 in recesses 38 and 39 against axial movement and permit rotor shaft 29 to rotate on the pins 37 (see Figs. 4 and 4a).

Housing 26 comprises a semi-cylindrical wall 26$^a$ and integrally formed semi-circular end walls 26$^b$ and 26$^c$. Housing 26 is secured to base 25 by a plurality of cap screws 45 which extend through openings formed in the base and take into threaded recesses formed in the bottom edges of the walls of housing 26. A gasket 46 is interposed between the bottom edges of the walls of housing 26 and the inner surface of base 25 to provide a fluid tight seal. The assembled base and housing have an internal motor chamber 47 of semi-cylindrical form. Passages 48 and 49, formed in the base 25 and communicating with chamber 47 and exteriorly of the motor through opposite sides of the base, are provided to admit and exhaust fluid from chamber 47.

Rotor shaft 29 is journaled in a bearing bushing 50, formed of a suitable bearing metal, that is fitted within a semi-cylindrical recess 51 formed in the inner surface of base 25, and in semi-cylindrical openings 52 formed in the side walls of housing 26 that register with outer end portions of recess 51. Bushing 50 is provided annular end portions 50ª and 50ᵇ which concentrically fit within the circular openings provided by registration of the openings 52 with recess 51. Bushing 50 is also provided with a semi-cylindrical portion 50ᶜ which is integrally formed with and extends between the portions 50ª and 50ᵇ, and which seats within recess 51 within chamber 47. A plurality of spaced openings 50ᵈ, extending through the portion 50ᶜ, aline with similarly spaced openings 25ª formed in base 25 for a purpose that will be hereinafter explained. Although not shown, it may be assumed that the bushing portion 50ᶜ is suitably secured to base 25 in recess 51 against rotary and axial movement as by dowel pins or the like.

Adjacent each end shaft 29 is provided with a pair of annular grooves in which are fitted split seal rings 29ª that seat against the inner surfaces of the bushing portions 50ª and 50ᵇ. The portion of shaft 29 lying within chamber 47 is transversely slotted to accommodate the rectangular base portion 53ª of a piston vane 53. Vane portion 53ª is secured to shaft 29 within the slot by a plurality of dowel pins 54 which extend through and are staked in aligned openings in the shaft and vane portion. The vane is provided with an integral portion 53ᵇ which closely conforms to the rectangular longitudinal cross sectional form of the motor chamber 47. Flat fiber laminations 55, fitted within rectangular recesses 56 formed in the outer and side edges of vane portion 53ᵇ are resiliently urged into engagement with the inner surfaces of walls 26ª, 26ᵇ and 26ᶜ of housing 26 to provide a fluid seal for the vane portion with such wall surfaces. As best shown in Figs. 6 and 7, laminations 55 are fitted in the recesses 56 in a plurality of layers, with the joints between laminations of each layer overlapped by laminations in adjacent layers. The laminations are resiliently urged outwardly of vane portion 53ᵇ by coiled compression springs 57 that bear at one end against the bottom of recesses 58 which open into the bottom ends of recesses 56. Springs 57 bear at their other ends against rectangular metallic pressure plates 59 and triangular metallic corner pressure plates 60, which are intermediate the laminations 55 and the springs 57 and which serve to distribute the spring force evenly along the laminations.

Limit stop or bumpers 61 secured to the inner surface of base 25, on opposite sides of shaft 29, serve to limit the rotary movement of piston vane 53 in chamber 47. Air or other fluid may be admitted or exhausted from chamber 47 on one side of vane 53 by a flexible hose or conduit 62 which is connected to the outer end of passage 48. Similarly, a flexible conduit 63 connected to passage 49 provides for admitting or exhausting air or other fluid from chamber 47 on the other side of vane 53. Conduit 62 is secured to the outer surface of housing portion 26ª by straps 64, and such conduit together with conduit 63 may be assumed to be connected to a suitable four-way valve whereby air or other fluid may be simultaneously admitted to one of these conduits and exhausted from the other conduit and vice versa.

Assuming that air under pressure is admitted to conduit 63 and is simultaneously exhausted through conduit 62, piston vane 53 will rotate in the counterclockwise direction and the motor bushing will rotate in the clockwise direction from their respective positions shown in full lines in Fig. 1, and will assume the final positions depicted therefor in Fig. 3 to open the buckets 21 and 22 to the broken line positions depicted therefor in Fig. 1. To return buckets 21 and 22 to closed position, air is simultaneously admitted to conduit 62 and exhausted from conduit 63 to drive vane 53 clockwise and the motor housing counterclockwise to closed position depicted in Fig. 1. Due to the weight of the buckets they would tend to move to the closed position in the event all fluid pressure is removed from the motor chamber 47. Because air or other fluid can only be exhausted at a certain rate from the motor chamber on one side of the piston vane, the latter will be cushioned in its movement to prevent too rapid movement and hammering against the limit stops 61.

The alined openings 25ª and 50ᵈ in base 25 and in bushing portion 50ᶜ, respectively, vent the interstice between shaft 29 and such bushing portion to atmospheric pressure, thereby insuring that the rotor shaft will snugly seat against the bearing bushing and materially reduce the chance of leakage of fluid between opposite sides of the piston vane in the motor chamber.

By appropriately dimensioning the motor cylinder length and width, and correspondingly dimensioning the piston vane assembly, the motor can exert appreciable torque in opening and closing clam shell shovels when supplied with air or other fluid under conventional working pressures of 100 to 110 p. s. i. For example, with a motor having a motor cylinder radius of 14 inches and length of 20 inches, the maximum torque exerted by the rotor shaft would be on the order of 16,000 lb.-ft., at a fluid pressure of 100 p. s. i.

Figs. 8 and 9 disclose a modified form of motor wherein the piston vane rotates through a rotary angle of approximately 270° whereas the motor hereinbefore described is limited to rotation through an angle of less than 180°. The modified motor comprises a base 100 having an elevated, integral bearing pad 100ª, an intermediate housing member 101, and an upper semi-cylindrical housing member 102. Member 101 is secured to base 100 by a plurality of cap screws 103 penetrating suitable clearance openings in base 100 and a gasket 104, interposed between members 100 and 101, and taking into threaded recesses formed in member 101. Similarly, member 102 is secured to member 101 by a plurality of cap screws 105 which penetrate clearance opening in member 101 and a gasket 106, interposed between members 101 and 102, and take into threaded recesses formed in member 102.

The piston vane and rotary shaft assembly of the modified form of motor is exactly like that aforedescribed in connection with Figs. 1 through 7 and the elements thereof have been given identical reference numerals. Such assembly is journaled in a bearing bushing 107, which comprises annular end portions 107ª and 107ᵇ that concentrically seat within axially alined openings in the side walls of the motor housing assembly and which comprise the integral intermediate portion 107ᶜ of cylindrical segment form. The portion 107ᶜ seats against and is secured to a complementally formed surface on bearing pad 100ª. Base 100 has passages 108 and 109 formed therein for admitting and exhausting of fluid under pressure to the motor chamber.

Fig. 10 discloses another, and more conventional, hoist suspension for a clam shell incorporating a fluid motor operator. The suspension comprises link chains 110 secured to the upper outside corners of the buckets, and to a ring or yoke 111 to which a hoisting line 112 is also secured.

Figs. 11 and 12 disclose still another form of hoist suspension for clam shells incorporating the aforedescribed fluid motor apparatus. More particularly, it comprises a bail member 125, having an intermediate circular arc portion 125ª which is concentrically spaced apart from the outer cylindrical surface 26ª of member 26 of the fluid motor, and having integral circular arc end portions 125ᶜ of smaller radius which abut against and are welded to the surface 26ª. Member 125 is suspended on a roller 126 which is rotatable on a pin 127 that is journaled in the lower ends of a pair of spacer plates 128 and 129. At their upper ends, plates 128 and 129 have a pin 130 journaled therein, and a hoisting line 131 is clamped around a bushing 132 disposed on pin 130 between the spacer plates. Pin 127 has an enlarged head at one end and is transversely drilled at its other end to accommodate a cotter key. The pin 130 is transversely drilled adjacent each end thereof to accommodate cotter keys.

During operation of the motor to close the clam buckets member 125 will glide in the counterclockwise direction on roller 126 until the portion 125c engages such roller, and the motor and bucket operating arms 27 and 30 will then assume positions like that shown in Fig. 1. When the motor is operated to open the clam buckets, member 125 will glide clockwise on roller 126 and will assume the position depicted therefore in Fig. 1.

I claim:

1. In combination, a clam shell shovel comprising a pair of cooperating buckets pivoted about a common axis, and a fluid powered motor comprising a housing to which one of said buckets is secured and having a cylindrical segment chamber, a shaft concentric with the pivotal axis of said buckets and having at least one portion extending outwardly of said housing to which the other bucket is secured and a vane secured to said shaft within said chamber and affording relative rotation of said shaft and said housing upon development of differences in fluid pressure on opposite sides thereof.

2. The combination according to claim 1 wherein said shaft has portions extending outwardly of said housing on opposite sides thereof to which the opposite sides of said other bucket are respectively secured.

3. The combination according to claim 2 wherein the first mentioned bucket is secured to said housing by members attached to the inner side walls of such bucket and the opposite side walls of the motor housing and wherein said other bucket is non-rotatably secured to said shaft by a pair of members attached to the inner side walls of said bucket and non-rotatably attached to said portions of said shaft extending outwardly of said housing on opposite sides of the latter.

4. In a fluid motor, in combination, a housing comprising a base and a hollow cylindrical segment member removably secured to said base providing a motor chamber of corresponding form, a rotor shaft concentric with the longitudinal axis of said chamber and extending outwardly on opposite sides of said member, a bearing secured to said base within said chamber and in openings in said sides of said member in which said shaft is journaled and comprising annular end portions seating within said openings in the sides of said member and an integral cylindrical segment portion extending between said end portions within said chamber, a rectangular piston vane secured to and extending radially of said shaft along the portion of the latter within said chamber, and non-metallic seal members disposed within side and end edge recesses in said vane and biased outwardly into engagement with the cylindrical and side walls of said member bounding said chamber.

5. The combination according to claim 4 wherein a plurality of openings extend through said base and aline with openings formed in the cylindrical segment portion of said bearing to vent the interstice between said shaft and said bearing portion to atmospheric pressure.

6. The combination according to claim 5 wherein the portions of said shaft which are concentric with the annular portions of said bearing are provided with annular grooves and seal rings are fitted therein.

7. The combination according to claim 6 wherein said seal members comprise sheet laminations disposed in a plurality of layers within said recesses and are biased outwardly of such recesses by compression springs bearing against pressure plates underlying said members.

8. In combination, a clam shell comprising a pair of cooperating buckets pivoted about a common axis, a fluid powered motor comprising a housing to which one of said buckets is secured, a shaft concentric with the pivotal axis of said buckets and having portions extending outwardly of said housing on opposite sides thereof to which the other bucket is secured and a vane secured to said shaft within said housing and affording relative rotation of said shaft and said housing upon development of differences in fluid pressure on opposite sides thereof, and hoisting yoke to which a hoisting line is secured comprising parallel members pivotally secured adjacent corresponding ends to the outer ends of said shaft and at least one transverse member secured to said parallel members adjacent the other ends of the latter.

9. In combination, a clam shell comprising a pair of cooperating buckets pivoted about a common axis, a fluid powered motor comprising a housing to which one of said buckets is secured, a shaft concentric with the pivotal axis of said buckets and having portions extending outwardly of said housing on opposite sides thereof to which the other bucket is secured and a vane secured to said shaft within said housing and affording relative rotation of said shaft and said housing upon development of differences in fluid pressure on opposite sides thereof, and hoisting means to which a hoisting line is secured for raising and lowering the clam shell and motor assembly.

10. The combination according to claim 9 wherein the hoisting means comprises a bail member rigidly secured to said housing, and an assembly to which a hoisting line is secured including a roller which bears against the inner arcuate surface of said bail member.

References Cited in the file of this patent

UNITED STATES PATENTS

| | | |
|---|---|---|
| 1,870,538 | Voorwinde | Aug. 9, 1932 |
| 1,950,276 | Taylor | Mar. 6, 1934 |
| 1,971,698 | Wills et al. | Aug. 28, 1934 |
| 1,974,717 | Le Bleu | Sept. 25, 1934 |
| 1,984,692 | Nichols | Dec. 18, 1934 |
| 2,140,571 | Blocker | Dec. 20, 1938 |
| 2,278,806 | Tilton | Apr. 7, 1942 |
| 2,404,262 | Whitfield | July 16, 1946 |
| 2,629,639 | Johansen | Feb. 24, 1953 |

FOREIGN PATENTS

| | | |
|---|---|---|
| 4,008 | Netherlands | Nov. 1, 1919 |